June 24, 1924.

J. W. TAYLOR

BALL VALVE

Filed April 26, 1922

1,498,590

Inventor
John W. Taylor

By Walter F. Murray
Attorney

Patented June 24, 1924.

1,498,590

UNITED STATES PATENT OFFICE.

JOHN W. TAYLOR, OF CINCINNATI, OHIO.

BALL VALVE.

Application filed April 26, 1922. Serial No. 556,620.

*To all whom it may concern:*

Be it known that I, JOHN W. TAYLOR, a citizen of the United States of America, and a resident of Cincinnati, in the county of Hamilton and State of Ohio, have invented a new and useful Improvement in a Ball Valve, of which the following is a specification.

My invention relates to that class of valve employed in flush tanks, the valve serving to close off communication between the supply tank and the bowl.

An object of my invention is to provide a valve which will not be distorted by long continued use.

Another object of my invention is to provide a valve, the efficiency of which will not be impaired by long continued use.

These and other objects are attained by means described herein and disclosed in the accompanying drawing, in which.

Figure 1:
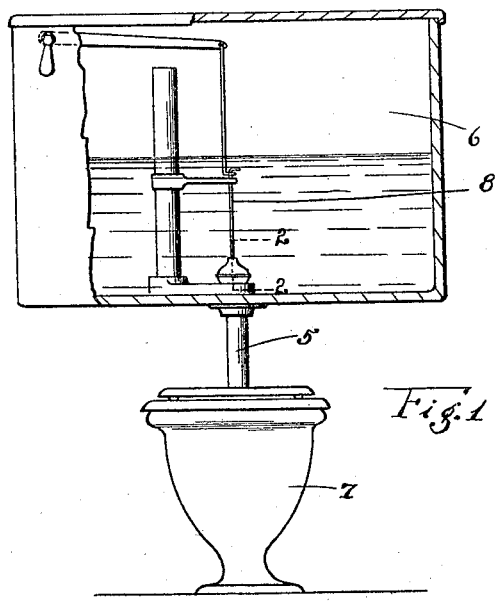
Fig. 1 is a fragmental front elevation of a bowl and flush tank, in connection with which, valves embodying my invention, are used.
Figure 2:
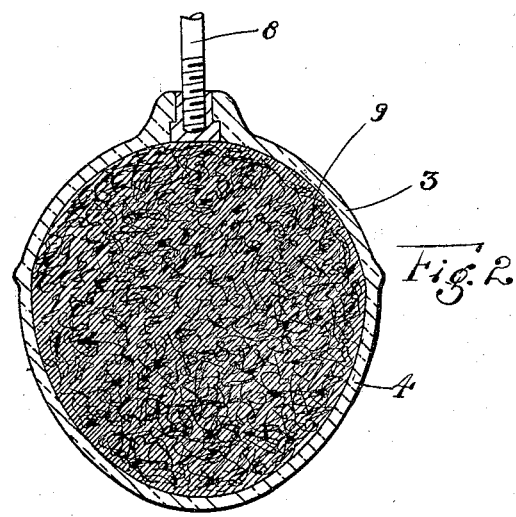
Fig. 2 is an enlarged sectional view on line 2—2 of Fig. 1.

The valve 3 comprises a rubber shell 4 in the nature of a ball, and is adapted to seat upon the upper end of the discharge pipe 5, thereby controlling communication between the supply tank 6 and the bowl 7. The valve rod 8 may be attached to the ball 4 in any suitable manner. The ball is filled with cork granules 9 which granules may be treated with oil or some other suitable substance to preclude deterioration of the elements. Although the cork granules are stuffed into the shell 4 each of the granules retains its individuality whereby the valve comprises a filler of individual particles of cork which are bound together by the shell 4.

The cork may be dispensed with, and some other soft light material, which will function as do the particles of cork within the ball, may be used. These small particles serve to retain the shape of the shell or ball 4 thereby preventing leakage by the ball valve. If desired the valve may be but partly filled with the granules which are held about the seating portion of the ball valve, thereby attaining substantially the same result as if the shell were entirely filled with such granules.

This structure provides an efficient valve which will not wedge upon the seat, and which will not become distorted or weakened thru use.

What I claim is:

1. In a valve of the class described the combination of a flexible casing and a mass of individual granules within the casing adapted to retain the contour of the casing.

2. In a valve of the class described the combination of a flexible casing, and a mass of granules adapted to yieldingly retain the casing in a given form.

3. In a valve of the class described the combination of a flexible casing and a mass of cork granules within the casing, the cork granules serving to retain the casing in a given form, and the casing serving to protect the granules from foreign substances.

4. In a valve of the class described the combination of a rubber ball, and a mass of cork granules within the ball, the granules being adapted to yieldingly retain the rubber ball in a given form, and the rubber ball protecting the granules from foreign substances.

In testimony whereof, I have hereunto subscribed my name this 25th day of April, 1922.

JOHN W. TAYLOR.